United States Patent [19]

Molnar

[11] Patent Number: 4,786,127
[45] Date of Patent: Nov. 22, 1988

[54] LIGHT SOURCE FOR FIBRE OPTIC INSTRUMENTS

[76] Inventor: Bohuslav Molnar, 56 Milbourne Cres., Oakville, Ontario, Canada, L6H 4E9

[21] Appl. No.: 132,806

[22] Filed: Dec. 14, 1987

[51] Int. Cl.⁴ .............................................. G02B 6/00
[52] U.S. Cl. ................................ 350/96.10; 350/96.20; 362/32
[58] Field of Search ............... 350/96.10, 96.15, 96.18, 350/96.20; 362/32, 31

[56] References Cited

U.S. PATENT DOCUMENTS

| | | | |
|---|---|---|---|
| 3,638,013 | 1/1972 | Keller | 362/32 |
| 3,758,951 | 9/1973 | Scrivo et al. | 362/32 |
| 3,775,606 | 11/1973 | Bazell et al. | 362/32 |
| 4,060,724 | 11/1977 | Heine et al. | 362/32 |
| 4,232,934 | 11/1980 | Feinbloom | 350/96.20 |
| 4,397,523 | 8/1983 | Feinbloom et al. | 350/96.20 |
| 4,579,419 | 4/1986 | Scrivo | 350/96.20 |
| 4,623,217 | 11/1986 | Hallén | 350/96.10 |

Primary Examiner—William L. Sikes
Assistant Examiner—Frank González
Attorney, Agent, or Firm—Riches, McKenzie & Herbert

[57] ABSTRACT

A light source device for illuminating a selected receptor end of a number of fibre optic cables, having a light source which provides a concentrated point source of light, a movable selector to allow alignment of a selected aperture in which a receptor end of a fibre optic is located, with the light source, and further having an adjustable positioning means for displacing the light source and the selected aperture relative to each other, so as to allow the concentrated point source of light to be exactly focused on the receptor end located in the selected aperture.

10 Claims, 3 Drawing Sheets

LIGHT SOURCE FOR FIBRE OPTIC INSTRUMENTS

INTRODUCTION

The present invention relates to a light source for fibre optic instruments and more particularly to a light source having an adjustable focus mechanism to allow a concentrated point source of light emanating therefrom to be focused on a selected receptor end of a fibre optic cable.

BACKGROUND OF THE INVENTION

The present invention is an improvement upon the fibre optic light source device disclosed in Canadian Patent No. 980,312, corresponding to U.S. Pat. No. 3,831,017, which is concerned with apparatus for selectively illuminating the receptor end faces of fibre optic cables supplied by different manufacturers.

Canadian Patent No. 980,312 teaches a light source device having a lamp support means for presenting a lamp or incandescent bulb as the source of illumination, and a movable selector, which in the preferred embodiment is a circular rotatable turret supporting the receptacles at different angular positions on an arc which intercepts the lamp lens. Such movable selector-turret is positioned at the lens end of the lamp, and at least a pair of receptacles are mounted on such selector, each receptacle having an aperture therein for receiving the receptor end of a fibre optic cable and being alignable with the lamp upon movement of the selector. The receptacles are each of different configuration to enable respectively different cable receptors to be fitted thereto.

As a further refinement, Canadian Patent No. 980,312 contemplates use of a light concentrating means in the form of a concave reflector element 12 for providing a concentrated point source of light focused on the receptor ends of the fibre optic cables, as shown in FIGS. 3,4, and 5 thereof. The reflector has the effect of being able to direct most of the emitted light to the receptor end of the fibre optic cable, thereby increasing the intensity and brilliance of the light available from the fibre optic cable.

Means by which light may be concentrated are well known in the art, and include, as disclosed in Canadian Patent No. 980,312, providing a concave reflector positioned behind the lamp or incandescent bulb, to reflect the light towards the apertures in which the receptor ends of the fibre optic cables are received. The concave reflector may also be an integral part of the lamp or incandescent bulb itself, wherein the interior concave side of the bulb opposite the apertures in the receptacles is coated with a highly reflective substance.

Convex lens means may also be incorporated for concentrating the light from the light source on the fibre optic cable receptor ends.

A problem which manifested itself in the design of Canadian Patent No. 980,312, was that because the fibre optic cables and their corresponding receptor ends were usually of different manufacture, not all would have their receptor ends aligned in a common plane when they are located in the receptacle on the movable selector-turret of the light source device. Accordingly, when a light concentrating means was employed, this meant that while the receptor ends of some fibre optic cables would optimally be in a position wherein the light emitted from the light source was concentrated on a point exactly on the receptor end, other receptor ends of cables of different manufacture would be axially displaced either towards, or away from, the light source, with the result that the concentrated point source of light would not be focused at the receptor end. In this instance there would result a loss of intensity of light available to the particular fibre optic cable.

SUMMARY OF THE INVENTION

To overcome the above described disadvantage of the prior art, the present invention contemplates that the device described earlier in Canadian Patent No. 980,312 be further advantageously provided with an adjustable focusing device to allow focusing of the concentrated point source of light on the receptor end of a particular selected fibre optic cable. Thus when the movable selector is used to position another receptor end of another selected fibre optic cable in a line of sight with the light source and the concentrated point of light emanating from the light source, an adjustable positioning means may be provided so as to allow re-positioning of the concentrated point source of light on the receptor end of the newly selected fibre optic cable.

Accordingly, in one broad aspect of the invention, the invention relates to a light source device for illuminating the receptor ends of a various fibre optic cables, comprising a plurality of fibre optic cable receptacles each having an aperture therein for respectively receiving and removably securing therewithin the receptor end of one of the fibre optic cables; a light source means for providing on an axis extending from said light source means a concentrated point source of light a given distance from said light source means; movable selector means for aligning a selected of the apertures of the receptacles along said axis; and adjustable positioning means for adjustably displacing said point source of light and said selected aperture relative to each other along said axis to focus said point source of light on said receptor end located in said selected aperture.

In a further refinement to the above embodiment, wherein a lens means, such as a convex lens, or a concave reflector means, is used to provide a concentrated point source of light a distance from the lamp or light source, an adjustable positioning means may be provided for adjustably displacing the lens means, and a selected aperture containing the receptor end of a fibre optic cable, relative to each other along an axis passing through the concentrated point source of light and the light source means itself, to allow the point source of light to be focused on the receptor end of the selected fibre optic cable.

In a preferred embodiment of the invention, it is contemplated that the adjustable positioning means adjustably position the light source means relative to the selected aperture, which may be axially fixed in location. Accordingly, provision may be made for mounting the light source means on a support means, and slidably mounting the support means within a housing member, to allow for slidable displacement of the support means relative to the selected aperture along an axis which passes through the aperture and the point source of light.

In a still further preferred embodiment, the adjustable positioning means may advantageously comprise manually rotatable screw means to slidably displace said support means, and in a still further preferred embodiment, the manually rotatable screw means further comprises a rotatable spindle rotatably affixed to said housing member and having an external helically threaded portion; said support means further comprising a slider element having an internal helically threaded portion adapted to receive therewithin said external helically threaded portion of said rotatable spindle; wherein rotation of said rotatable spindle within said slider element causes slidable displacement of said support means relative to the apertures of said plurality of fibre optic receptacles.

In a further preferred embodiment of the invention, to at least approximately position each of the receptor ends of various fibre optic cables within a certain range of axial positions within the fibre optic device, it is contemplated that the receptacles and/or adaptors which removably receive the receptor ends of various fibre optic cables be of varying lengths. This allows for a rough positioning of each of the receptor ends of the various fibre optic cables within a common axial plane relative to the light source means. The adjustable positioning means may accordingly then be used to fine-tune the positioning of the concentrated point source of light, so as to focus the point source exactly on the receptor end of a selected fibre optic cable. In this preferred embodiment, the adjustable positioning means is used to accommodate minor variations in the positioning of the focal point of light relative to the receptor ends of the cables that may arise for various reasons, such as the use of different types of incandescent bulbs with variously positioned lenses, or alternatively incomplete or partial insertion of a receptor end of a fibre optic cable into its receptacle or adaptor fitting.

BRIEF DESCRIPTION OF THE DRAWINGS

Further objects and advantages will appear from the following detailed description of the invention, taken together with the accompanying drawings in which.

DETAILED DESCRIPTION OF THE DRAWINGS

FIGS. 1-5 show a light source device 10 of the present invention for illuminating receptor ends 12 of various fibre optic cables 14a,b,c,d.

Figure 3:
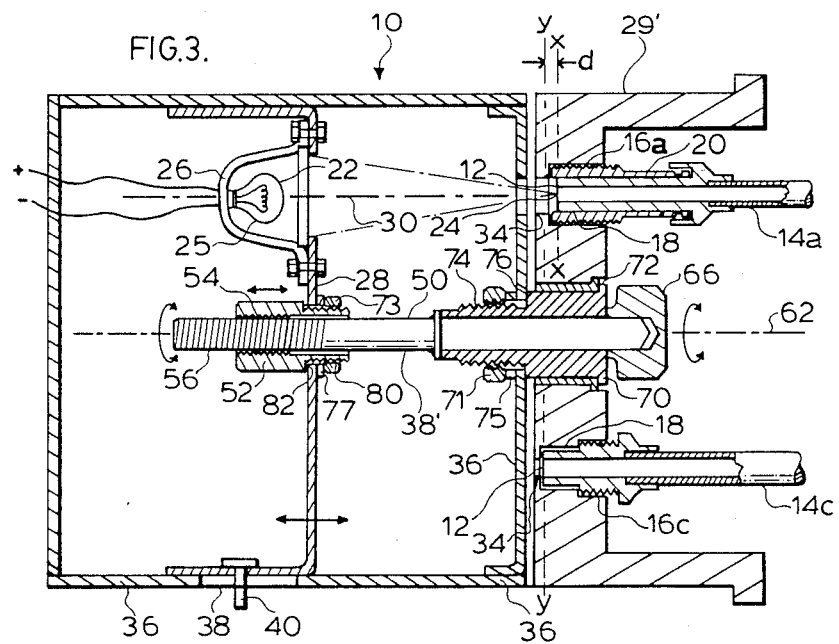
FIG. 3 is a cross-sectional view of the embodiment of the invention shown in FIG. 2, taken along cutting plane A—A.
Figure 4:
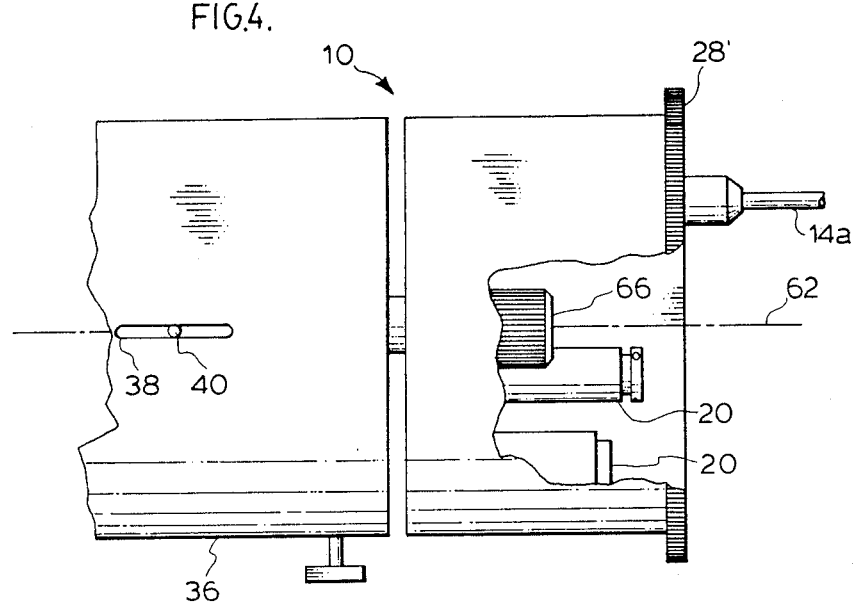
FIG. 4 is a side elevational view of the embodiment of the invention shown in FIG. 2, taken in the direction of Arrow C.
Figure 5:
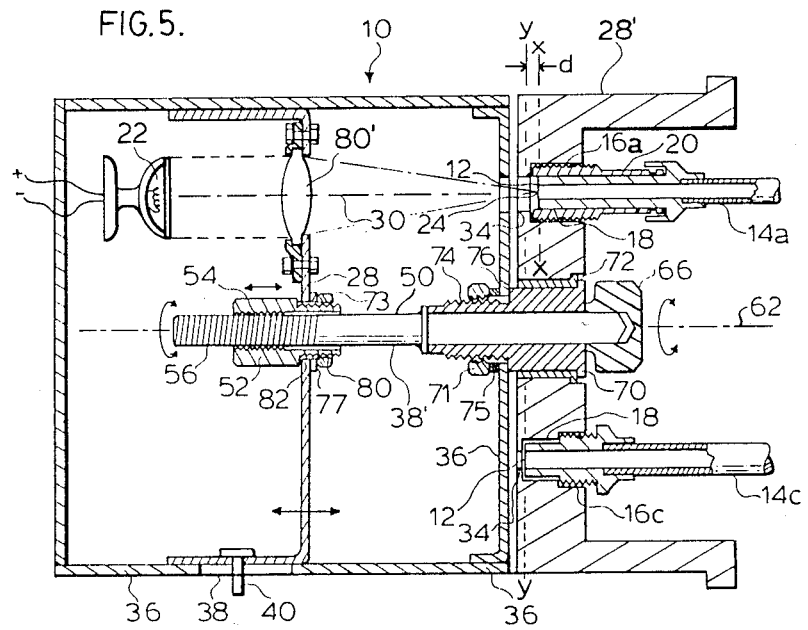
FIG. 5 is a cross-sectional view of a further embodiment of the invention taken along cutting A—A of the embodiment shown in FIG. 2.

In a broad aspect of the present invention light source device 10 comprises a plurality of fibre optic cable receptacles such as 16a, 16c shown in FIGS. 3 and 5, generally having threaded recesses. Such receptacles 16a,c each have an aperture 18 therein for respectively receiving and removably securing therewithin the receptor end 12 of one of the various fibre optic cables 14a, 14c.

A modification of this design is possible where the receptacles 16a and aperture 18 therewithin are adapted to receive and removably secure adaptor fittings 20, which are in turn adapted to be removably secured to receptor ends 12 of various fibre optic cables 14a, 14c, to further increase the compatability of light source device 10 with various makes and models of fibre optic cables 14a,c, and their respective receptor ends and fittings.

Figure 1:
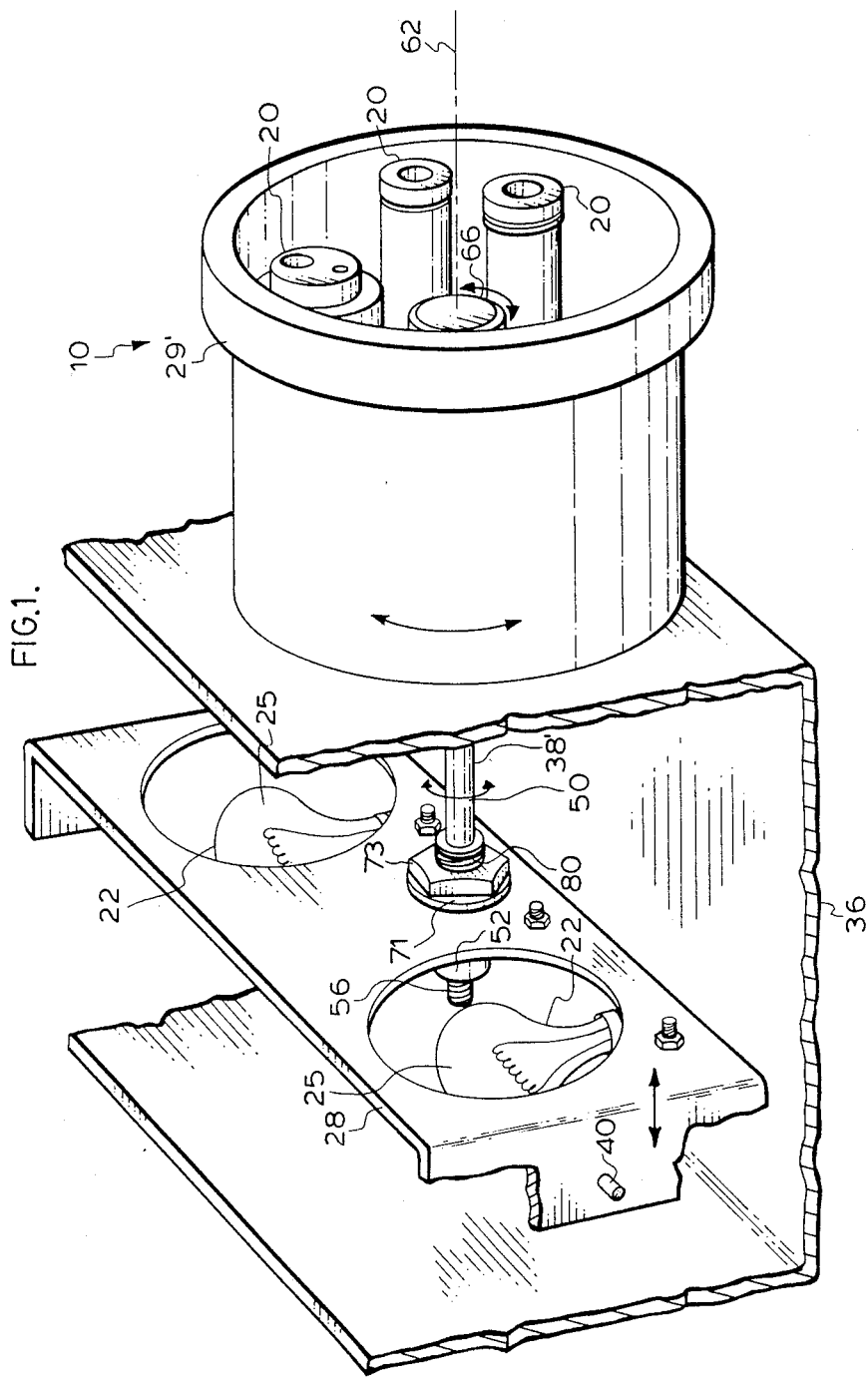
FIG. 1 is a perspective view of a preferred embodiment of the light source device of the present invention.

Light source device 10, as shown in FIGS. 1,3 and 5, further comprises light source means 22 for providing a concentrated point source of light 24 a given distance from the light source means 22. Such light source means 22 may be comprised of a single light source, or dual light source as shown in FIG. 1, wherein one of such light sources may also be used as an emergency back-up. Accordingly, back-up light source means 22 may be used in similar fashion to the main light source means 22.

Generally light source means 22 comprises a lamp 25, usually an incandescent bulb, with a concave-shaped reflector 26 for reflecting light emitted from the rear surface of the lamp 25 forwardly to concentrate such light at a point 24 a given distance in front of the lamp 25. Alternatively the lamp 25 itself may have on one side a concave reflective coating (not shown) for reflecting and concentrating light from the lamp 25 at a point 24 a given distance from the lamp 25 when the lamp 25 is illuminated.

On the exterior of the light source device 10 there is provided a movable selector means 29 which is manually accessible to allow alignment of a selected of the apertures 18 along an axis 30 on which lies the point source of light 24 and the light source means 22. Such selector means 29 allows a particular aperture 18, with a particular receptor end 12, of a fibre optic cable 14a,c positioned therein, to be selected and movably positioned by the movable selector means 28 to lie along such axis 30, so that light may be supplied to that particular fibre optic cable 14a-d through a fixed aperture 34 in the housing member 36 of the light source device 10. Where dual light source means 22 are used, as shown in FIG. 1, two apertures 34 are present in the housing member 36, each being aligned with the respective light source means 22, to allow the movable selector 29 to be rotated to align a selected aperture 18 with either of the desired light source means 22.

Adjustable positioning means 38 are further provided, which, in the first embodiment, allows for adjustable displacement of a support means 28, on which is mounted the light source means 22, relative to a selected aperture 18 along axis 30, so as to allow focusing of the concentrated point source of light 24 on the receptor end 24 of the fibre optic cable 14a-d located in the particular selected aperture 18.

In a further refinement of the first embodiment, the support means 28 is slidably mounted in a housing member 36 to allow slidable movement thereof along the axis 30 by the adjustable positioning means 38. Such slidable movement may easily be accomplished by the provision of a tab means, such as a protruding threaded screw member 40, as shown most clearly in FIGS. 1&4, slidable in a groove 42 in the housing member 36. Such groove 42 allows slidable movement of the support means 28 in an axial direction relative to the apertures 18, and for this reason is longitudinally aligned parallel to axis 30, as shown in FIGS. 3 and 5.

In order that the adjustable positioning means 38 be able to focus the point source of light 24 on the receptor end 12 of a particular fibre optic cable 14a-d, it is necessary that the support means 28, and the apertures 18, be capable of being displaced relative to each other over a distance equal to, and preferably greater than, the distance 'd' shown in FIGS. 3 and 5. Distance 'd' represents the distance from a plane 'y', in which the receptor end 12 nearest the light source means 22 will lie, and a plane 'x', in which the receptor end 12 farthest the light source means 22 will lie.

If such criterion is met, the light source device 10 and adjustable positioning means 38 will be able to focus the point source of light 24 on each of the receptor ends 12 located nearest to and farthest from the light source means 22, and also on any selected apertures 18 having receptor ends which may fall within such range.

In a further refinement of the first embodiment, the adjustable positioning means comprises manually rotatable screw means 38', and in a still further refinement, the adjustable positioning means 38 comprises a rotatable spindle 50 rotatably affixed to the housing member 36. A slider element 52 having an internal helically threaded portion 54 adapted to receive therewithin an external helically threaded portion 56 of the rotatable spindle 50 is provided, wherein rotation of the rotatable spindle 50 within the slider element 52 causes slidable displacement along the axis 30 of the support means 28 relative to the apertures 18 of the plurality of fibre optic receptacles 16a,c as can be seen in FIGS. 1,3 and 5.

Figure 2:
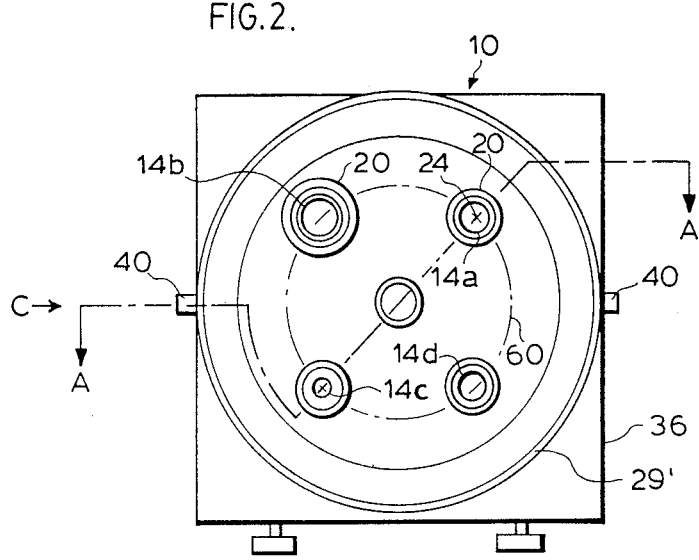
FIG. 2 is a front view of the preferred embodiment of the invention shown in FIG. 1.

Selector means 29, for selectively aligning a selected of the apertures 18 with the light source means 22 and aperture 34, in a preferred embodiment of the invention, is a circular rotatable turret 29', as shown in FIG. 1, rotatably affixed to the housing member 36 and supporting the plurality of receptacles 16a,c at different angular positions on an arc 60 which intercepts the concentrated point source of light 24. The rotatable spindle 50 in a still further embodiment is contemplated as being rotatably affixed to the circular turret 29' at the center of the arc 60, and having an axis of rotation 62 passing through the center of the arc 60, as shown in FIGS. 2,3, and 5.

In addition, the spindle 50 may protrude outwardly from the circular turret 29', and a knob 66 provided thereon to allow manual grasping and rotation of the spindle 50 to allow adjustable positioning of the support means 28, and consequently adjustable positioning of the concentrated point source of light 24.

To rotatably affix the spindle 50 to the circular turret 29' and also to the housing member 36, a sleeve 70, and a bushing 72 may be provided, wherein the sleeve 70 has a threaded portion 74 and shoulder portion 76 thereon to allow it to be fixedly mounted by means of a helically threaded nut 71 to the housing member 36 of the light source device 10, as shown in FIGS. 3 and 5. Similarly the slider element 52 may be configured similarly to the sleeve 70, and fixedly attached to the support means 28 by means of a helically threaded nut 73, such slider element also having a threaded portion 80 and abutting shoulder 82 to allow attachment to the support means 28. Washers 75, 77 respectively may be interposed between the nuts 71, 73 when the sleeve 70 and slider element 52 are respectively affixed to the housing member 36 and support means 28. As briefly mentioned earlier, unlike sleeve 70, slider element 54 possesses internal helical threads 54 therein which engage external helical threads 56 on the rotatable spindle 50, which when the spindle 50 is rotated, cause displacement of the slider element 52 and support means 28 axially along axis 30, and 62.

In a second embodiment of the invention, shown in FIG. 5, the light source means 22 may be fixedly attached to the housing member 36, and a movable lens means 80 provided, movable by an adjustable positioning means 38 in a similar fashion as previously disclosed for the support means 28 and light source means 22 mounted thereon, so as to allow the concentrated point source of light 24 to be focused on the receptor end 12 of a selected fibre optic cable 14a,c.

It is contemplated the movable lens means 80 may be in the form of a movable concave reflective means (not shown), located on the side of the light source means 22 opposite the apertures 18, to reflect light emitted from the light source means 22, and concentrate such light at a point source 12. Similar to the first embodiment, the concave reflective means may in this second embodiment be positioned by the adjustable positioning means 38 so as to allow focusing of the point source of light 24 on the selected receptor end 18 of fibre optic cable 14a,c.

In another variation of this second embodiment, the movable lens means 80 may be a convex lens means 80' as shown in FIG. 5, or series of lenses, through which light from the light source means 22 may pass. The convex lens means 80' may then be adapted to concentrate light emitted from the light source means 22 at a focal point 24. Similar to the first embodiment, the lens means 80' may be mounted on a support means 28, and adjustable positioning means 38 as earlier described similarly used to adjustably position the support means and movable lens means 80' mounted thereon so as to focus the concentrated point source of light 24 on the selected receptor end 12 of a fibre optic cable 14a,c.

Although the description describes preferred embodiments of the invention, it is not to be limited to such embodiments. Other variations may now become apparent to persons skilled in the art. For a complete definition of the invention, reference should be made to the claims appended to this specification.

The embodiments of the invention in which an exclusive property or privilege is claimed are defined as follows:

1. A light source device for illuminating receptor ends of a plurality of fibre optic cables, comprising:
   a plurality of fibre optic cable receptacles each having an aperture therein for respectively receiving and removably securing therewithin the receptor end of one of the fibre optic cables;
   a light source means for providing on an axis extending from said light source means a concentrated point source of light a given distance from said light source means;
   movable selector means for aligning a selected one of the apertures of the receptacles along said axis; and
   adjustable positioning means for adjustably displacing said point source of light and said selected aperture relative to each other along said axis to focus said point source of light on said receptor end secured within said selected aperture.

2. The light source device as claimed in claim 1, said light source means mounted on a support means, said support means slidably mounted in a housing member for slidable displacement along said axis by said adjustable positioning means.

3. The light source device as claimed in claim 2, wherein said adjustable positioning means comprises manually rotatable screw means.

4. The light source device as claimed in claim 3; said manually rotatable screw means comprising a rotatable spindle rotatably affixed to said housing member and having an external helically threaded portion; and said support means further comprising a slider element having an internal helically threaded portion adapted to receive therewithin said external helically threaded portion of said rotatable spindle;

wherein rotation of said rotatable spindle within said slider element causes slidable displacement of said support means relative to said apertures of said plurality of fibre optic receptacles.

5. The light source device as claimed in claim 4, wherein said selector means for selectively aligning a selected of the apertures of the receptacles along said axis is a circular rotatable turret, said turret rotatably affixed to said housing member and supporting said plurality of receptacles at different angular positions on an arc which intercepts said concentrated point source of light.

6. The light source device as claimed in claim 5, said rotatable spindle rotatably affixed to said circular turret at the center of said arc and having an axis of rotation passing through said center of said arc, said spindle protruding outwardly from said circular turret to allow manual grasping and rotation of said spindle.

7. The light source device as claimed in claim 1, said plurality of receptacles such of a different configuration to allow variously configured receptor ends of fibre optic cables to be respectively received therein.

8. The light source device as claimed in claim 1, wherein said light source means is an incandescent bulb having on one side a concave reflective coating for reflecting and concentrating light from said bulb a given distance from said bulb when illuminated.

9. A light source device for illuminating receptor ends of different fibre optic cables, comprising:

a plurality of fibre optic cable receptacles each having an aperture therein for respectively receiving and removably securing therewithin the receptor end of one of the fibre optic cables;

a light source means;

lens means for concentrating light from said light source means so as to provide a concentrated point source of light;

means for aligning a selected one of the apertures of the receptacles along an axis on which lies said concentrated point source of light and said light source means; and adjustable positioning means for adjustably displacing said lens means and said selected aperture relative to each other along said axis to focus said point source of light on said receptor end secured within said selected aperture.

10. The light source device as claimed in claim 9, wherein said lens means is a concave reflective means for reflecting and concentrating light from said light source a given distance from said light source means.

* * * * *